United States Patent [19]
Schlueter, Jr. et al.

[11] Patent Number: 5,514,436
[45] Date of Patent: May 7, 1996

[54] ENDLESS PUZZLE CUT SEAMED BELT

[75] Inventors: Edward L. Schlueter, Jr.; Thomas C. Parker, both of Rochester; Robert M. Ferguson, Penfield; Robert N. Finsterwalder, Webster; Lucille M. Sharf, Pittsford; Laurence J. Lynd, Macedon; David Battat, Rochester, all of N.Y.

[73] Assignee: Xerox Corporation, Stamford, Conn.

[21] Appl. No.: 297,200

[22] Filed: Aug. 29, 1994

[51] Int. Cl.$^6$ ............................ F16G 1/00; B65G 15/30; B65G 17/06
[52] U.S. Cl. ................... 428/57; 474/249; 474/250; 474/252
[58] Field of Search .................... 474/249, 250, 474/252; 428/57

[56] References Cited

U.S. PATENT DOCUMENTS

| | | |
|---|---|---|
| 766,930 | 8/1904 | Clemons . |
| 1,303,687 | 5/1919 | Leffler ................................ 138/169 |
| 2,060,906 | 11/1936 | Snyder ................................ 428/57 |
| 2,069,362 | 2/1937 | Ford .................................... 24/38 |
| 2,441,460 | 5/1948 | Walters .............................. 474/254 |
| 2,461,859 | 2/1949 | Vasselli .............................. 24/38 |
| 2,792,318 | 5/1957 | Welch ................................ 428/60 |
| 3,300,826 | 1/1967 | Read ................................... 24/38 |
| 3,342,656 | 9/1967 | Papageorges ..................... 156/159 |
| 3,729,873 | 5/1973 | Sandell ............................. 451/531 |
| 4,063,463 | 12/1977 | Nordengren ...................... 74/231 J |
| 4,808,657 | 2/1989 | Brown .............................. 524/518 |
| 4,899,868 | 2/1990 | Johnson ............................ 198/520 |
| 5,092,823 | 3/1992 | Longo ............................... 474/253 |

Primary Examiner—Patrick J. Ryan
Assistant Examiner—Rich Weisberger
Attorney, Agent, or Firm—Samuel E. Mott; Zosan S. Soong

[57] ABSTRACT

An endless flexible seamed belt with a mechanically invisible seam and substantially equivalent in performance to a seamless belt is formed by joining two ends of material from which the belt is fabricated each end of which has a plurality of mutually mating elements in a puzzle cut pattern which are in interlocking relationship in at least one plane and which when joined mechanically enable the flexible belt to essentially function as an endless belt having a substantially uniform thickness.

13 Claims, 5 Drawing Sheets

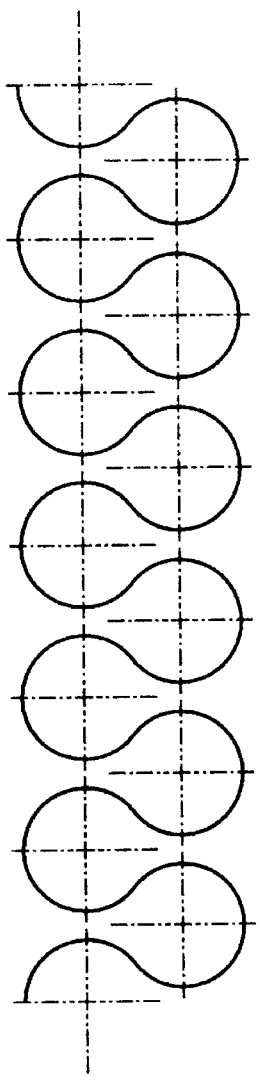 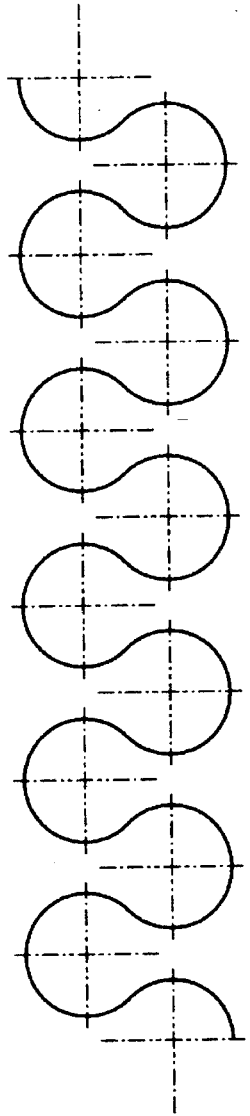 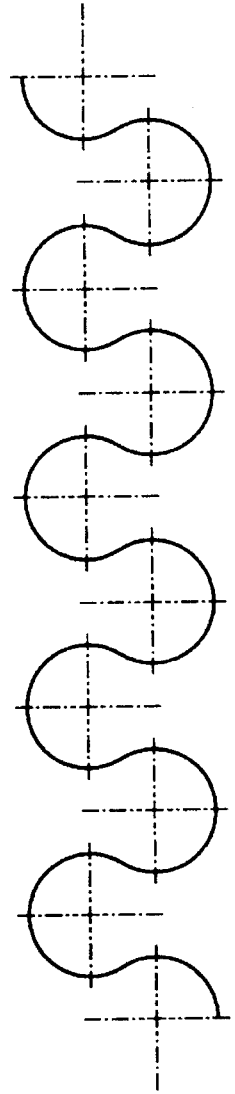
FIG. 6A  FIG. 6B  FIG. 6C

ENDLESS PUZZLE CUT SEAMED BELT

Attention is directed to copending U.S. appln. Ser. No. 08/297,198 (D/93563) titled "PUZZLE CUT SEAMED BELT WITH STRENGTH ENHANCING STRIP," copending U.S. appln. Ser. No. 08/297,201 (D/94225) titled "PUZZLE CUT SEAMED BELT WITH BONDING BETWEEN ADJACENT SURFACES BY UV CURED ADHESIVE," and copending U.S. appln. Ser. No. 08/297,203 (D/94227) titled "PUZZLE CUT SEAMED BELT WITH BONDING BETWEEN ADJACENT SURFACES," all commonly assigned to the assignee of the present invention and filed concurrently herewith.

BACKGROUND OF THE INVENTION

The present invention is directed to an endless flexible seamed belt having improved seam quality and smoothness with substantially no thickness differential between the seamed portion of the belt and the adjacent portions of the belt.

Perhaps, the most important invention that may have ever been made was that of the wheel. Arguably, one of the follow-on inventions of almost equal importance was directed to a belt. Initially, the belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic and electrographic imaging apparatus and processes for use as photoreceptors, intermediate sheet and/or image transport devices, fusing members or transfix devices, it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding, strength and flexibility because of the limited contact area formed by merely butting or overlapping the two ends of the belt material. Furthermore, belts formed according to the butting or overlapping technique provide a bump or other discontinuity in the belt surface leading to a height differential between adjacent portions of the belt of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With a bump, crack or other discontinuity in the belt the tuck of the blade is disturbed, which allows toner to pass under the blade and not be cleaned. Furthermore, seams having differential heights may when subjected to repeated striking by cleaning blades cause the untransferred, residual toner to be trapped in the irregular surface of the seam. Photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturbs the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet.

In these sophisticated applications, it is desired to provide a seam height differential between the seam and the unseamed adjacent portions less than 0.001 inch. In addition, the presence of the discontinuity in belt thickness reduces the tensile strength of the belt which for prolonged use is desirably 80–90% that of the parent material unseamed. Furthermore, and with particular respect to prolonged use or life particularly in multiple color applications, it is desired that the seamed belt have seam mechanical bonding, strength and flexibility capable of satisfactory performance for at least 500,000 cycles. In addition, the discontinuity or bump in such a belt may result in inaccurate image registration during development, inaccurate belt tracking and overall deterioration of motion quality, as a result of the translating vibrations.

SUMMARY OF THE INVENTION

Accordingly, it is a principle object of the present invention to provide a seamed belt with mechanically invisible seams substantially equivalent in performance to that of a seamless belt.

It is a further object of the present invention to provide an endless seamed belt where there is substantially no bump or height differential between the seamed portions and unseamed portions on each side of the seam, leading to performance failure, or degradation of cleaning blade performance, image registration, belt tracking or motion quality from translating vibrations.

According to a principle aspect of the present invention the above objects are obtained by providing a flexible seamed belt formed by joining two ends of the belt material having a plurality of mutually mating elements in a puzzle cut pattern the opposite surfaces of which are in an interlocking relationship in at least one plane to prevent separation of the ends and which when joined mechanically enable the seamed flexible belt to essentially function as an endless belt having a substantially uniform thickness.

It is a further aspect of the present invention to provide a flexible seamed belt of sufficient physical integrity to enable it to essentially function as an endless belt.

It is a further aspect of the present invention to provide a seamed belt wherein the individual portions of the puzzle cut pattern may be movable relative to each other while being solely mechanically locked in position relative to each other without otherwise being reinforced.

It is a further principle aspect of the present invention that there is no substantial thickness differential in between the seam and the adjacent interlocking mating elements on each side of the seam.

It is a further aspect of the present invention wherein the interlocking elements all have curved mating surfaces.

It is a further aspect of the present invention wherein the mutual mating elements are male and female interlocking portions and wherein the mating interlocking elements have the same configuration.

It is a further aspect of the present invention wherein each of the interlocking elements has a post or neck portion and a larger head or node portion.

In a further aspect of the present invention the neck portion and node portion form interlocking teeth.

It is a further aspect of the present invention to provide a seamed belt wherein the height or thickness differential between the seam and unseamed portions is less than 0.001 inch.

It is a further aspect of the present invention to provide a seam in a seamed belt having at least 80% and preferably 90% of the tensile strength of the parent belt material.

It is a further aspect of the present invention to provide a seamed belt having the seam mechanical bonding strength and flexibility are capable of at least 500,000 cycles without seam failure.

In a further aspect of the present invention the mutual mating interlocking elements form a dovetail pattern.

In a further aspect of the invention the seam is at an angle or slanted with respect to the parallel sides of the belt.

BRIEF DESCRIPTION OF THE DRAWINGS

FIGS. 6A, 6B and 6C are three representations of the puzzle cut configuration which will be discussed hereinafter.

DESCRIPTION OF PREFERRED EMBODIMENT

Figure 1:
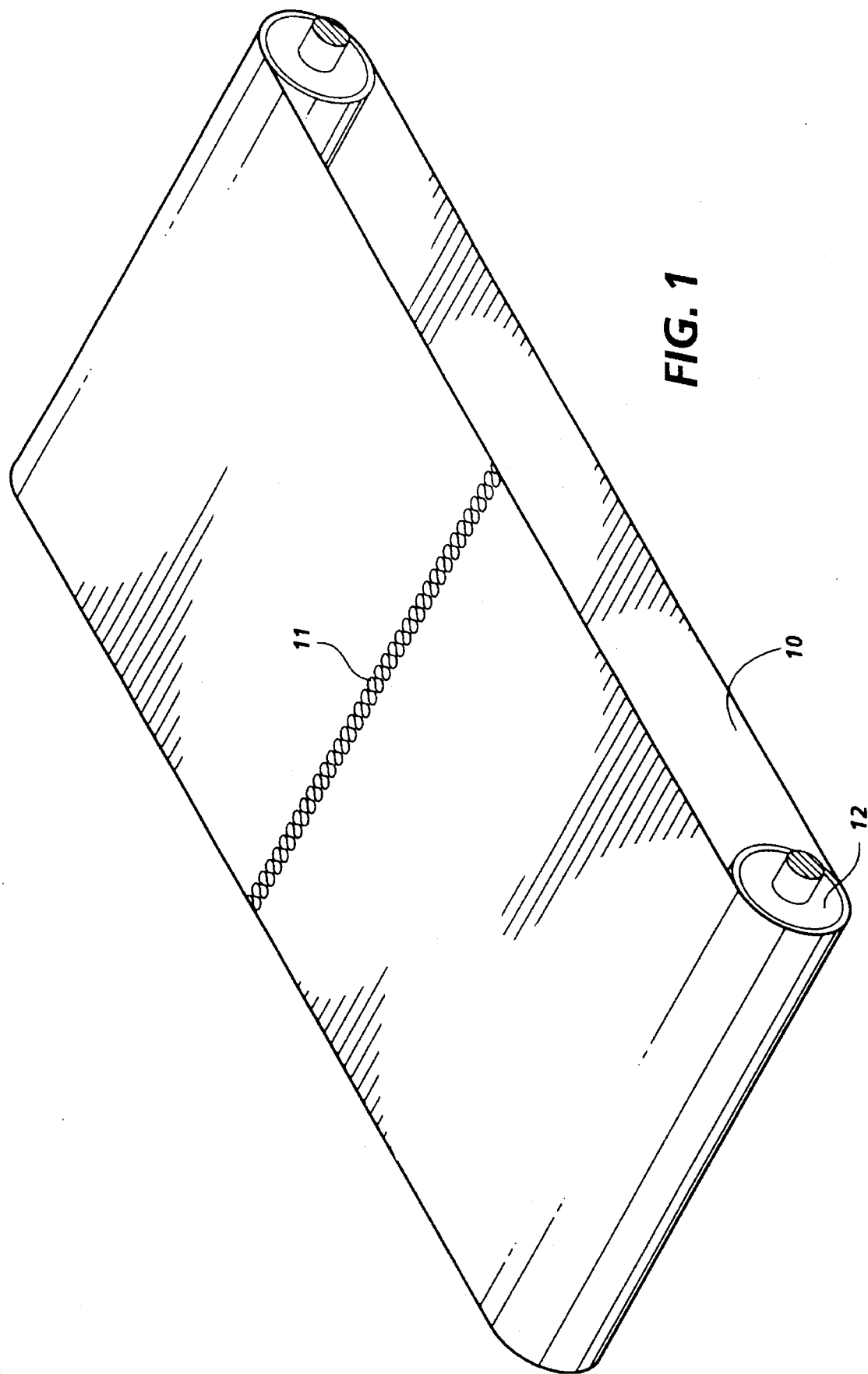
FIG. 1 is an isometric representation of the flexible puzzle cut seamed belt formed according to the present invention providing a mechanically invisible and substantially equivalent seam in performance to that of a seamless belt. While the seam is illustrated as being perpendicular to the two parallel sides of the belt it will be understood that it may be angled or slanted with respect to the parallel sides of the belt.

With continued reference to the Figures and additional reference to the following description the invention will be described in greater detail. The seam formed according to the present invention is one of enhanced strength, flexibility and mechanical life which is held together solely by the geometric relationship between the ends of the belt material, which are fastened together by a puzzle cut, meaning that the two ends interlock with one another in the manner of an ordinary puzzle. This provides an improved seam quality and smoothness with substantially no thickness differential between the seamed and the adjacent unseamed portions of the belt, thereby providing enhanced imaging registration and control as discussed above. The smoothness and thickness differential are of course enhanced by the fact that the ends of the belt material are of the same thickness. Further, it should be noted that the lower the differential in height the faster that the belt may travel. Referring to FIG. 1, it should be noted that while the mechanical interlocking relationship of the seam 11 is present in a two dimensional plane when the belt 10 is on a flat surface, whether it be horizontal or vertical, that the ends of the puzzle cut interlock may separate around a curved surface such as a roll 12, while not disjoining the belt and become rejoined when the belt re-enters a two dimensional plane. This of course depends on the diameter of the curved surface. The larger the diameter the lesser the opportunity for the ends of the seam to separate. While the seam is illustrated in FIG. 1 as being perpendicular to the two parallel sides of the belt it will be understood that it may be angled or slanted with respect to the parallel sides. This enables any noise generated in the system to be distributed more uniformly and the forces placed on each mating element or node to be reduced.

The endless flexible seamed belt may be made of any suitable material. Typical materials include, photoreceptor materials which may be multilayered such as those described in U.S. Pat. No. 4,265,990, as well as a variety of thermoplastic and thermosetting belt materials. Any suitable belt material may be employed. Typical materials include polyesters, polyurethanes, polyimides, polyvinyl chloride, polyolefins such as polyethylene and polypropylene and polyamides such as nylon, polycarbonates, acrylics. In addition, elastomeric materials such as silicones, fluorocarbons such as Vitons (E. I. DuPont™), EPDM and nitriles etc. For certain purposes metallic cloth and even paper may be used. The belt material is selected to have the appropriate physical characteristics such as tensile strength, Young's modulus, electroconductivity, thermal conductivity and stability flex strength and in certain applications, such as transfix, being capable of being subjected to high temperatures. Other important characteristics of the belt material include surface energy desired low for good toner release, for example, gloss, dielectric constant and strength as well as flex life and strength of the seamed areas.

The puzzle cut pattern may be formed according to any conventional shaping technique, such as by die cutting or laser cutting with commercially available lasers, such as a CO2 laser or eximer laser generating a beam of sufficient width and intensity that within an acceptable time will provide the desired cut. Following cutting by the laser beam it can be deburred and cleaned by air, ultrasonics or brushing if necessary. In addition to puzzle cut patterns formed by joining the two ends, they may be formed by mechanical techniques such as for example, forming each of the ends by a male and female punch or with the belt material in between which forms or punches out the shape. Alternatively, it could be a pattern on a wheel which rolls over the material.

Figure 2:
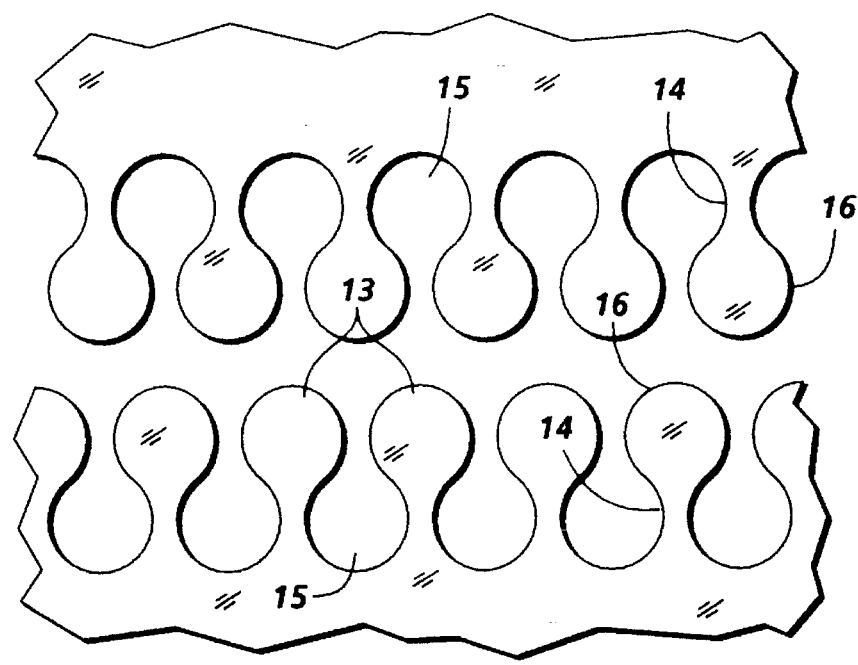
FIG. 2 is an enlarged view of a puzzle cut pattern used on both joining ends of the belt material to provide interlocking elements or teeth having a post or neck 14 and a larger head or node portion 16 forming a pattern of male portion 13 and interlocking female portion 15.
Figure 3:
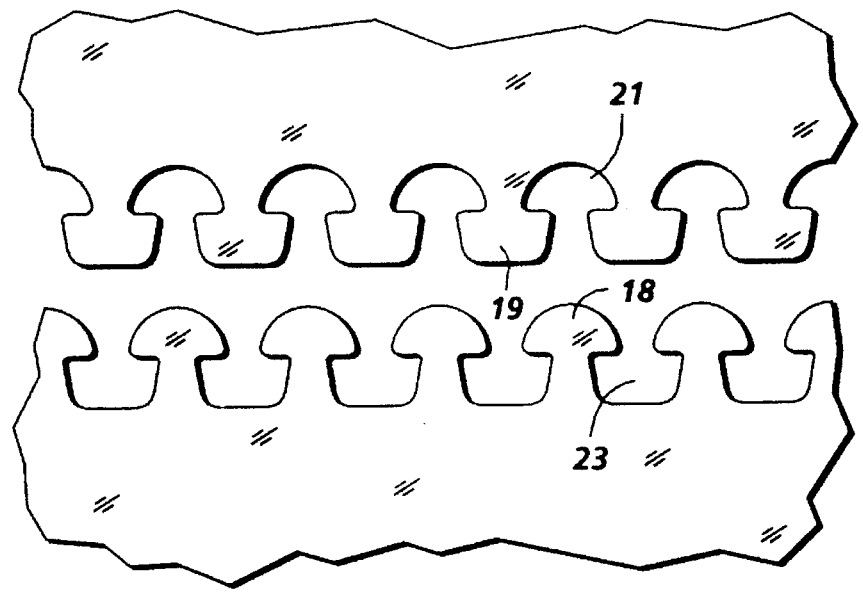
FIG. 3 is illustrative of an alternative configuration wherein male 18, 19 and female 21, 23 interlocking portions having curved mating elements are used in the two ends of the belt material which are joined.
Figure 4:
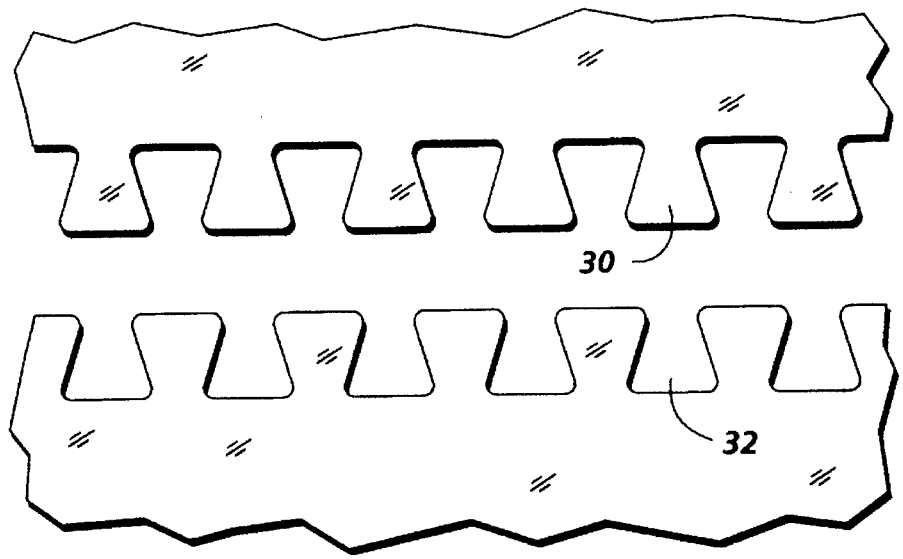
FIG. 4 is a further alternative embodiment wherein the interlocking elements 30, 32 form a dovetail pattern having curved mating elements.
Figure 5:
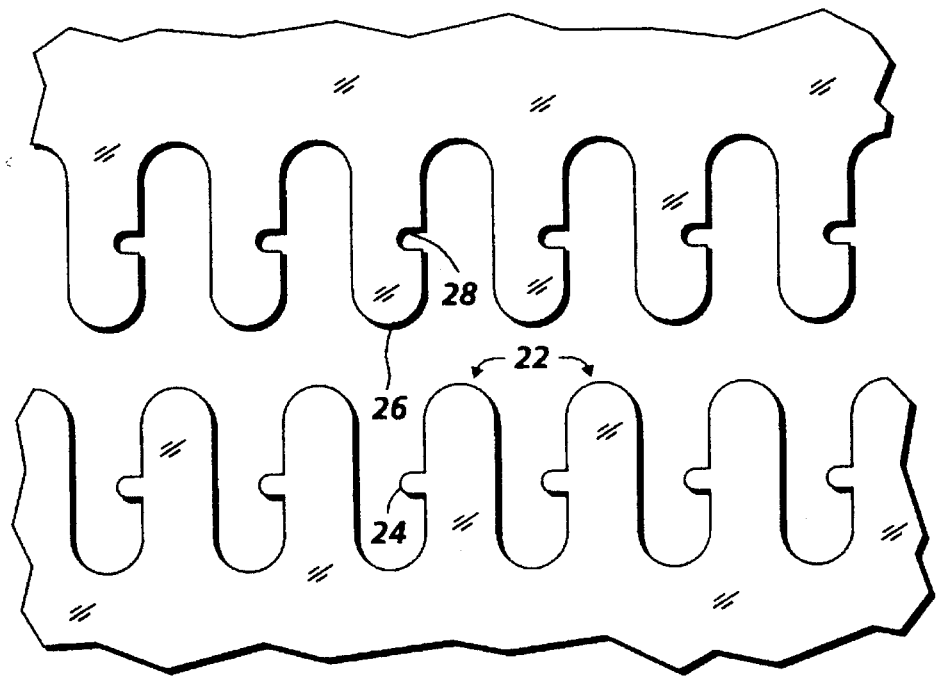
FIG. 5 is an additional alternative embodiment wherein the interlocking relationship between the puzzle cut pattern on both ends is formed from a plurality of finger joints 22, 26.
Figure 7:
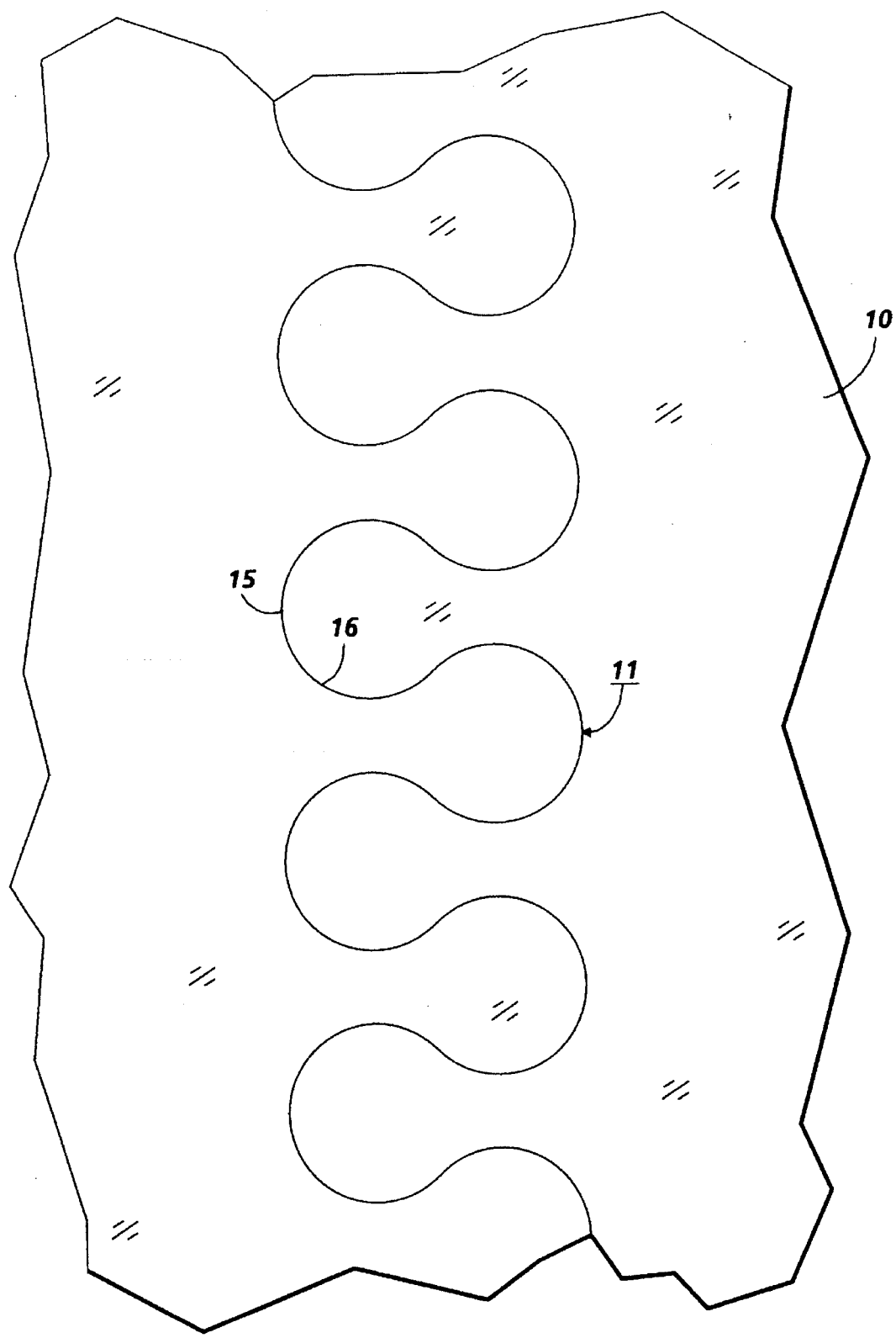
FIG. 7 is a greatly exaggerated in scale representation illustrating essentially no space between interlocking elements which may for example be each precision die cut or laser cut from two separate pieces of material wherein the cutting of one element may be compensated for the kerf or space between elements.

As may be observed from the drawings, the puzzle cut pattern may take virtually any form, including that of teeth having identical post or neck 14 and head or node 16 patterns of male 13 and female 15 interlocking portions as illustrated in FIG. 2, or a more mushroom like shaped pattern having male portions 18 and 19 and female portions 21 and 23 as illustrated in FIG. 3 as well as a dovetail pattern 20 as illustrated in FIG. 4. The puzzle cut pattern illustrated in FIG. 5 has a plurality of male fingers 22 with interlocking teeth 24 and plurality of female fingers 26 forming male fingers receptacles which have recesses 28 to interlock with the teeth 24 when assembled. It is important that the interlocking elements all have curved mating elements to reduce the stress concentration between the interlocking elements and prevent them from separating when traveling around curved members such as the rolls 12 of FIG. 1.

It has been found that with curved mating elements that the stress concentration is lower than with square corners where rather than the stress being uniformly distributed it is concentrated leading to possible failure. In some cases when the diameter is large and when the load is removed from the belt, the interlocking members may partially disengage and allow the seam to act in a hinge-like manner. The mechanical bonding, strength and flexibility of the bond should be capable of supporting a belt cycling of at least 500,000 cycles and the height differential between the seamed portion and the unseamed portion on each side of the seam about 0.001 inch and the seam have a tensile strength of at least 80% and preferably 90% of the parent belt material strength.

The following is a discussion of the interrelationship among the various belt and material parameters involved in the mechanical integrity of the seam.

The mechanical integrity of the seam was examined and analyzed for a number of configurations and in particular for the preferred configuration which involves nodes forming parts of a circle and interconnecting via a neck on the opposite side. To determine the deflection under loading conditions, each such node is treated as a beam fixed at the narrowest part of the neck joining the node to the base and the deflection of each tooth (node and neck) is calculated in terms of the orientation of the load relative to the beam. To assure that the seam will not come apart under load, it is imposed that the maximum deflection of each tooth, when the load, under worse conditions, is normal to the beam, would not exceed the thickness of the belt itself. Clearly, if the deflection of the tooth is in excess of the thickness of the belt then the seam will come apart. Under the above brief analysis, a master relationship connecting a material parameter M typical of the configuration with a geometric parameter G such that the belt will not come apart under loading.

$$M = \frac{1-G}{\left(1+\sqrt{4-\frac{1}{G^2}}\right)^3} \quad (1)$$

In this relationship M is a dimensionless quantity given by $$M = \frac{4NR^3}{Et^4} \quad (2)$$

and G represents the ratio $$G = 2R/w \quad (3)$$

where N is the total load per unit width (i.e. lbs/in.) acting on the belt, E is the modulus of elasticity of the belt material t, the thickness of the belt, R the radius of the circular node forming the seam, and w is the wave length of one whole period between two adjacent nodes. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying equation (1), by virtue of the fact that there is an infinite number of combinations of the variables involved in that particular pair of values of M and G. Inspection of the geometry of the node shows that the structure is characterized by two main features: the shoulder, or that portion where there is interference between adjacent teeth, which supports the seam, and the neck of each tooth which represents its strength under loading. The size of the shoulder should be sufficient to insure mechanical integrity of the seam without making the neck too small as to weaken its strength. In this regard attention is directed to FIGS. 6A, 6B and 6C wherein it can be visually observed that the size of the neck in FIG. 6A is too small and the size of the shoulder in FIG. 6C does not provide sufficient interference contact while the geometry in FIG. 6B appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the tooth is zero and the node has no strength. Once either M or G is known the entire configuration becomes determinate with the help of the above equations and other standard geometric relationships. Measurements on actual belts have generally confirmed the above analysis. To illustrate the solution methodology, suppose a belt material of Young's modulus $E=5\times10^5$ psi and thickness $t=0.004"$ is subjected to a tension $N=2.0$ lb./in. of belt width. H is the perpendicular height between centers of one node or one side of the seam and a node on the other side of the seam. The solution possibilities are given in Table 1 below such that the seam will not come apart. If a value $G=0.6$ is chosen as a compromise between seam integrity and node strength, we find

| | |
|---|---|
| Node Diameter | D = 0.448 mm |
| Period | w = 0.747 mm |
| Neck Width | g = 0.299 mm |
| Node Height | H = 0.69696 |

N, lb/in = 2.0
E, psi = 500000
t, in = 0.004

| G | 1/M | D | W | g | H |
|---|---|---|---|---|---|
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |

-continued

| | Node Diameter | | D = 0.448 mm | | |
|---|---|---|---|---|---|
| | Period | | w = 0.747 mm | | |
| | Neck Width | | g = 0.299 mm | | |
| | Node Height | | H = 0.69696 | | |
| | | N, lb/in = 2.0 | | | |
| | | E, psi = 500000 | | | |
| | | t, in = 0.004 | | | |

| G | 1/M | D | W | g | H |
|---|---|---|---|---|---|
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |
| .9800 | 1006.3020 | .1277 | .1303 | .0026 | .2376 |
| .9900 | 2026.1140 | .1012 | .1022 | .0010 | .1885 |

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide. The width of the seam may vary depending on roll diameter, material modulus or other parameters.

With reference to the embodiment illustrated in FIG. 2, the width of the belt may be typically of the order of 1 to 15 inches wide on a belt which is 16 to 44 inches long and the neck and node pattern may be formed from a male/female punch cut with each end being cut separately and subsequently being joined to form the seam with a roller similar to that used as a wall paper seamer rolled over the seam by hand to complete the interlocking nature of the puzzle cut pattern. The width of the space between adjacent nodes is less than about 0.003 mm wide. In evaluating the strength of the seam, one inch wide belt samples were hung vertically over a curved support at the top with the seam in a vertical section of the belt and a brass weight weighing one kilogram hung from the bottom of the belt. The size of the heads or nodes of the puzzle cut pattern was roughly one-half millimeter radius and the center to center distances from adjacent nodes was about 0.7 mm. The one inch wide belt was permitted to hang with the one kilogram weight for one week and the seam remained in tact during the entire period of time. A 15 inch width belt was also formed and similarly loaded and tested in the same manner for two weeks during which time the seam remained intact.

The two ends of the belt material which naturally are the same thickness are joined by physically placing them together in interlocking relationship. This may require the application of pressure to properly seat or mate the interlocking elements. It is once again noted that when the belt traverses a curved surface such as a roller that a portion of the interlocking elements may rise from the plane of the belt temporarily without the belt becoming separated from their mutual end portions.

Following fabrication, the belt may be finished by way of buffing or sanding and further, may have a suitable overcoating applied to control electrical properties, release properties, etc., which coating is typically of a thickness of 0.001 to 0.003 inch in thickness. While this can be initially applied to an already formed belt, and the seamed area filled from the back of the belt to maintain the uniformity of the functional surface, it is preferred and by far the most economical manner is to coat the belt material and then seam it.

Thus, according to the present invention an endless flexible seamed belt is formed, the seam of which is mechanically invisible and substantially equivalent in performance to a seamless belt. Furthermore, a seamed belt is provided by joining two ends wherein each end is fabricated having a plurality of mutually mating elements in a puzzle cut pattern which are in interlocking relationship in at least one plane to prevent separation at the ends. The individual portions of the puzzle cut pattern, while they may be movable relative to each other are solely mechanically locked in position relative to each other in a seam having interlocking mating elements. The seamed belt is formed without reinforcement such as by heating or adhesive agents and it enables accurate placement of the mating elements thereby permitting ease of assembly merely be mating the two pieces together. Further, a principle advantage is that there is no significant height differential between the seam and adjacent portions to the seam leading to the difficulties discussed above associated with seamed belts made by overlapping seams or a butting seam wherein a differential height is present or inadequate adhesion is present leading to vibrational noise effecting xerographic development and transfer as well as ineffectual cleaning of residual toner from a photoreceptor material from which the toner has been transferred as well as belt tracking and other features. Furthermore, it is believed that the seam so formed provides enhanced strength, flexibility and longer mechanical life when compared to seams formed by butting and overlapping.

The above cross referenced patent applications together with the patents cited herein are hereby incorporated by reference in their entirety in the instant application.

While the above invention has been described with reference to specific embodiments it is not intended to be limited thereto but rather those skilled in the art will recognize that variations and modifications may be made therein which are within the spirit of the scope and the appended claim.

It is claimed:

1. An electrostatographic imaging apparatus endless flexible seamed belt formed by joining two ends of material from which the belt is fabricated each end of which has a plurality of mutually mating elements in a puzzle cut pattern the opposite surfaces of which are in interlocking relationship in at least one plane to prevent separation of the ends and which form a seam when joined mechanically in the absence of an adhesive between the mutually mating elements to enable the seamed flexible belt to essentially function as an endless belt having a substantially uniform thickness, wherein the tensile strength of the seam is at least about 80% of the tensile strength of the belt material.

2. The seamed belt of claim 1 wherein the seam is mechanically invisible and substantially equivalent in performance to a seamless belt.

3. The seamed belt of claim 1 wherein the individual portions of the puzzle cut pattern at each end of the belt material may be movable relative to each other while being solely mechanically locked in position relative to each other.

4. The seamed belt of claim 1 wherein the interlocking elements all have curved mating surfaces.

5. The seamed belt of claim 1 wherein the mutually mating elements are male and female interlocking portions.

6. The seamed belt of claim 1 wherein all the mutually mating interlocking elements have the same configuration.

7. The seamed belt of claim 1 wherein each interlocking element has a post portion and a larger head portion.

8. The seamed belt of claim 7 wherein the post portion and head portion form interlocking nodes.

9. The seamed belt of claim 1 wherein the mutually mating interlocking elements form a dovetail pattern.

10. The seamed belt of claim 1 wherein the height differential between the seamed portion and the adjacent unseamed portion is less than about 0.001 inch.

11. The seamed belt of claim 1 wherein the tensile strength of the seam is at least 90% of the tensile strength of the parent belt material.

12. The seamed belt of claim 1 wherein the seam extends across the belt at an angle with respect to the parallel sides of the belt.

13. The seamed belt of claim 1 wherein the seam mechanical bonding, strength and flexibility is capable of satisfactory performance for at least 500,000 cycles.

* * * * *